Patented June 17, 1952

2,600,782

UNITED STATES PATENT OFFICE 2,600,782

COPOLYMERS OF DIMETHYLSTYRENES AND VINYL CYCLIC COMPOUNDS

Edward L. Kropa, Old Greenwich, Conn., assignor to American Cyanamid Company

No Drawing. Application July 20, 1948,
Serial No. 39,826

9 Claims. (Cl. 260—87.5)

This invention relates to fusible copolymers of dimethylstyrenes in which the methyl groups are nuclear substituents, and to the production of such copolymers. The invention is particularly directed to copolymers of a plurality of dimethylstyrenes and to copolymers of dimethylstyrenes with styrene itself.

An object of the present invention is to provide thermoplastic materials having a relatively high heat distortion as compared to polystyrene and similar thermoplastics previously available.

Another object of my present invention is to provide polymeric thermoplastic materials which mold easily, particularly by extrusion, injection or blow molding.

Still another object of the present invention is to provide a thermoplastic having the desirable properties of polystyrene but having a sufficiently high softening point to be resistant to water which is heated to temperatures of about 90°–100° C.

A further object of my invention is to provide a plastic which is of sufficient purity that molded articles produced therefrom have relatively high strength and do not craze during the life of the molded article.

A still further object of this invention is to provide a plastic having a relatively low density.

One other object of the present invention is to provide copolymerizable compositions which polymerize more rapidly than similar compositions containing styrene in place of dimethylstyrene.

Another object of my invention is to prepare copolymers which have a high degree of flexibility and yet are sufficiently hard to be used in coating compositions to form durable finishes on a wide variety of materials including leather, textiles, paper, asbestos, etc.

It is a further object of my invention to provide copolymers of dimethylstyrenes and styrene which have a higher degree of compatibility with other resinous materials than does polystyrene.

The above and other objects may be attained by copolymerizing a substantially pure dimethylstyrene in which the methyl groups are nuclear substituents, i. e., 2,4-dimethylstyrene, 2,5-dimethylstyrene and 3,4-dimethylstyrene, with a polymerizable cyclic compound containing an ethylenic double bond.

The following examples in which the proportions are given in parts by weight are for purposes of illustration. The invention is not to be construed as limited to the details therein set forth.

EXAMPLE 1

A mixture containing 1 part of 2,4-dimethylstyrene and 1 part of 2,5-dimethylstyrene is heated for about 6-7 days in the absence of air and catalyst, at the end of which time a hard, clear resin is obtained. Each of the dimethylstyrenes used in this example are inhibitor free and have a sufficiently high degree of purity that each individual styrene has a melting point within a range of not more than about 3° C. and an optical exaltation of at least one. The resin after polymerization is broken up into small pieces by impact and heated in a vacuum for 20 hours at 70°–100° C. to remove any traces of unpolymerized monomer.

The intrinsic viscosity of the resin is calculated according to the formula: $\log_e \eta_r/c$, where $\eta_r$ is the viscosity of a dilute solution of a polymer (i. e., 1% concentration) in toluene divided by the viscosity of toluene in the same units and $c$ is the concentration in grams of polymer in 100 cc. of solution. The intrinsic viscosity of the copolymer produced in accordance with this example is 0.86, and the A. S. T. M. plasticity determined on a Peakes-Rossi machine is 154° C.

The molding material prepared in the manner described above is placed in a compression mold, preheated for 5 minutes and then molded at 160°–170° C. at a pressure of 2000–3000 pounds per square inch for 2-5 minutes. The molded material is cooled in the mold to near room temperature and ejected. The molded article is clear, colorless, transparent, and has a high hardness and gloss. Standard A. S. T. M. bars, ½" x ½" x 5", are molded and the heat distortion of these bars is determined under standard A. S. T. M. conditions. The heat distortion is found to be about 108° C. which indicates that such moldings could be safely subjected to boiling water. Polystyrene made under the same conditions as those described in this example has a maximum heat distortion of about 77°–80° C., while polymerized 2,4-dimethylstyrene has a heat distortion of at least about 103°–105° C. and polymerized 2,5-dimethylstyrene, of at least about 106° C.

When a bar of the molded copolymer produced in accordance with the above disclosure is boiled in water under a 2 kilogram load over a 5" span, no distortion occurs. Under similar conditions, a similar bar of molded polystyrene distorts markedly. The specific gravity of the copolymer prepared in accordance with this example is slightly greater than 1.

EXAMPLE 2

A mixture of 1 part of 3,4-dimethylstyrene, 1 part of 2,4-dimethylstyrene and 1 part of 2,5-dimethylstyrene is copolymerized and molded in the manner described in Example 1. The resulting polymer has an intrinsic viscosity of 1.01, a plasticity of 147° C., and an A. S. T. M. heat distortion of 97° C.

EXAMPLE 3

A mixture containing 4.4 parts of 2,5-dimethylstyrene, 2.4 parts of 3,4-dimethylstyrene and 93.2 parts of 2,4-dimethylstyrene having a refractive index of 1.5409 is polymerized by heating for 6 days at 100° C. under nitrogen in a tapered, polished, stainless steel vessel in the presence of 50 p. p. m. of p-tertiary butyl catechol and 0.01% tertiary butyl hydroperoxide. Two batches of the resulting copolymer, from which any residual traces of monomer have been removed, are injection molded on an automatic cycle in a standard injection molding machine, and the physical and electrical properties thereof determined as follows:

*Molding data*

| Article Molded | Temperature ° F. | | | | Pressure on Material in p. s. i. | Molding Cycle in Secs.[1] |
|---|---|---|---|---|---|---|
| | Mold | Cylinder | | | | |
| | | Nozzle | Center | End | | |
| ½" x ½" x 5" bar. | 165 | 385 | 385 | 385 | 29,000 | 0-40-5-20 |
| 2" disc | 160 | 400 | 400 | 400 | 40,000 | 0-25-3-10 |
| 4" dish | 165 | 400 | 400 | 400 | 40,000 | 0-15-3-10 |

[1] In the table of molding data, the first figure of the molding cycle refers to the time required for the clamping ram to start forward; the second, to the time that the clamping ram starts to open; the third, to the time after the mold has closed and the injection ram moves forward; the fourth, to the time the injection ram maintains pressure on the piece in the mold.

*Properties of injection molded copolymer*

Heat distortion _____ 106° C.
Impact strength (ski ball) __ 0.10
Flexural _____ 7900
Mold shrinkage _____ 6.1 (average)
Dielectric constant _____ 2.5
Power factor _____ 0.0005 ($10^6$ cycles)

EXAMPLE 4

1 part of 3,4-dimethylstyrene and 1 part of 2,4-dimethylstyrene are copolymerized and molded in the same manner as described in Example 1 to produce a polymer having an intrinsic viscosity of 0.83, a Peakes plasticity of 142° C., and an A. S. T. M. heat distortion of 90° C.

EXAMPLE 5

A mixture of 1 part of 3,4-dimethylstyrene and 1 part of 2,5-dimethylstyrene is copolymerized and molded in accordance with the procedure of Example 1 to produce a polymer having an intrinsic viscosity of 1.10, a Peakes plasticity of 146° C., and an A. S. T. M. heat distortion of 87° C.

EXAMPLE 6

50:50 mixture of 2,4-dimethylstyrene and styrene containing 0.01% tertiary butyl hydroperoxide and 50 p. p. m. p-tertiary butyl catechol is heated in a vessel under nitrogen for 17 hours at 75° C., 24 hours at 85° C., 24 hours at 100° C., 24 hours at 110° C., and 72 hours at 128° C. The copolymer obtained contains less than 1% methanol solubles.

One portion of the copolymer prepared as described above is compression molded as described in Example 1 and found to have a heat distortion of 102° C., an impact strength (ski ball) of 0.22, a flexural strength of 11,900 and a Peake's flow of 144° C.

Another portion of the copolymer, injection molded as in Example 3, has a heat distortion of 95° C.

EXAMPLE 7

650 parts of 2,4-dimethylstyrene
650 parts of styrene containing 0.01% resorcinol
0.4 part of ammonium persulfate.
31.2 parts of a 25% aqueous solution of dioctyl sodium sulfosuccinate
0.3 part of sodium bicarbonate
2600 parts of distilled water All of the ingredients save the styrene and 2,4-dimethylstyrene are combined. The styrenes are added, and the mixture is mixed and agitated until an emulsion is formed. This emulsion is heated under reflux with agitation for 24 hours at 100° C. Any unreacted styrene or dimethylstyrene is then removed by blowing nitrogen into the emulsion maintained at approximately 98° C. and the reaction product is coagulated by addition of 10% aqueous sodium chloride.

The copolymer so obtained is washed by immersion in cold water which is gradually heated to boiling, after which the copolymer is filtered hot. This operation is repeated and the product finally dried.

Compression moldings of the copolymer are very slightly yellow articles having a heat distortion of 102° C.

EXAMPLE 8

A series of copolymers of styrene and 2,4-dimethylstyrene, as well as polymers of styrene and of 2,4-dimethylstyrene, is prepared by heating the materials with 0.01% tertiary butyl hydroperoxide and 50 p. p. m. of tertiary butyl catechol under an atmosphere of nitrogen in a sealed vessel for 4 days at 100° C. and 3 days at 130° C. Polymerization data of the copolymers and control polymers and physical properties of compression moldings follow:

| Polymer Composition | | Properties | | | |
|---|---|---|---|---|---|
| Per cent 2,4-dimethylstyrene | Per cent styrene | Per cent Methanol soluble | Specific viscosity at 0.05 M Concentration | Impact (ski ball) | Heat Distortion, ° C. |
| 100 | ---- | 2.0 | 0.572 | 0.095 | 110 |
| 80 | 20 | 1.2 | 0.612 | 0.17 | 105 |
| 60 | 40 | 1.3 | 0.668 | 0.19 | 103 |
| 40 | 60 | 1.2 | 0.777 | 0.19 | 99 |
| 20 | 80 | 1.1 | 0.900 | 0.21 | 96 |
| -------- | 100 | 0.9 | 1.198 | 0.24 | 92 |

It is apparent from the above impact strength figures that the impact strength of the copolymers is not a linear function of their compositions as would be expected. Only a very small quantity of styrene need be admixed with the 2,4-dimethylstyrene to produce a copolymer with markedly increased impact strength.

EXAMPLE 9

The mixtures listed below are combined and heated at 100° C. in the absence of air. The mixtures are tabulated in the order of their rates of polymerization, the most rapid being mixture No. 1. Mixture No. 4 copolymerizes much more slowly than mixture No. 1.

*Table*

| No. | | Peakes Plasticity | Intrinsic Viscosity |
|---|---|---|---|
| 1 | 1 part of 2,4-dimethylstyrene,[1] 1 part of 2,5-dichlorostyrene. | 139 | 0.308 |
| 2 | 1 part of 3,4-dimethylstyrene,[2] 1 part of 2,5-dichlorostyrene. | 122 | 0.511 |
| 3 | 1 part of 3,4-dimethylstyrene,[2] 1 part of styrene. | 126 | 0.543 |
| 4 | 1 part of 2,4-dimethylstyrene,[1] 1 part of styrene. | 128 | 1.433 |

[1] This 2,4-dimethylstyrene contains a small proportion of 2,6-dimethylstyrene and is free of saturated hydrocarbons.
[2] This 3,4-dimethylstyrene contains a small proportion of 2,3-dimethylstyrene and is free of saturated hydrocarbons.

All of the compositions are heated for one week at a temperature of about 100° C. Each copolymer is crystal clear and colorless and shows no discoloration when cut with nichrome wire heated to redness. Each copolymer is readily molded under heat and pressure to yield crystal clear moldings.

COMPARATIVE EXAMPLE 1

After removal of inhibitor followed by washing and drying, 52 parts of styrene are mixed with 66 parts of 2,6-dimethylstyrene and placed in a suitable vessel sealed under an atmosphere of carbon dioxide. The mixture is heated for 40 hours at 84° C. No color change is noted, but the mixture becomes quite viscous. The temperature is then raised and after one week at 100° C. the reaction mixture, while set, is extremely tacky.

It will be apparent from the preceding comparative example that a useful soluble, solid, thermoplastic copolymer of 2,6-dimethylstyrene with styrene cannot be prepared. This is not entirely surprising in view of the inability of the 2,6-dimethylstyrene to itself polymerize as disclosed in the copending application of Murray G. Sturrock and Thomas Lawe, Serial No. 48,938, filed September 11, 1948, now U. S. Patent 2,555,298.

Among the substances which may be copolymerized with the dimethylstyrenes in accordance with my invention are included styrene, o-, m-, and p-methylstyrenes, p-methoxystyrene, p-ethoxystyrene, p-cyanostyrene, any of the nuclear monochlorostyrenes, any of the nuclear dichlorostyrenes, o-, m-, and p-isopropenyltoluenes, isopropenylbenzene, styrenes containing one or more nuclear-substituted fluorine or bromine atoms, vinyl naphthalene, vinyl mesitylene, the vinyl diphenyls, vinyl carbazole, vinyl phenols, vinyl pyridine, vinyl furane, vinyl thiophene, etc.

In addition to copolymerization of dimethylstyrenes with the above cyclic compounds containing an ethylenic double bond, the present invention also includes within its scope the copolymerization of two or more dimethylstyrene isomers.

The present invention covers copolymers of 2,4-dimethylstyrene, 2,5-dimethylstyrene, and 3,4-dimethylstyrene. In order that the objects of the invention be attained, it is necessary that these dimethylstyrenes be substantially pure. I have found that they should melt within a range of no more than about 3° C. and have an optical exaltation of at least one. Dimethylstyrenes having this high degree of purity may be prepared in accordance with the Murray G. Sturrock and Thomas Lawe Patent No. 2,420,689, issued May 20, 1947.

The properties of the dimethylstyrene copolymers of the present invention, such as heat distortion and plasticity, may be varied over very wide ranges by variation in the ingredients of the copolymers and in the proportions thereof. In general, the copolymers may contain from 2 to 10 copolymerizable materials. In other words, each copolymerizable material must be present in an amount equivalent to at least 10% by weight of the total copolymerizable material. Thus, the proportion of any one copolymerizable material may be varied between 10% and 90% by weight of the total polymerizable composition.

I have found that the heat distortion of a copolymer according to the present invention is increased by the presence therein of a dimethylstyrene which contains a methyl group in the ortho position to the vinyl group. Thus, copolymers of 2,4-dimethylstyrene and 2,5-dimethylstyrene are superior in resistance to heat. On the other hand, the impact strength of a copolymer is greater when the dimethylstyrene contains a methyl group in meta position to the vinyl group. 3,4-dimethylstyrene, therefore, is a desirable ingredient of a copolymer of high impact strength. According to my invention, therefore, a copolymer of certain desired properties for a particular application may be prepared by varying the nature of the dimethylstyrene ingredient or ingredients as well as the relative proportions thereof. Along the same line I have also found that a small proportion of 2,5-dimethylstyrene in conjunction with a 2,4-dimethylstyrene copolymer markedly improves both the impact strength and the heat resistance of the 2,4-dimethylstyrene copolymer.

Copolymerization of the dimethylstyrenes according to the present invention may be carried out at any temperature which gives the desired rate of reaction and at the same time, the desired type of copolymer. Thus, the temperature may be varied over wide ranges such as, for example, from 20° C. (about 20° C.) up to 200° C. (about 200° C.). In order to obtain rapid copolymerization of the dimethylstyrenes in emulsions or dispersions in water, the reaction temperature is preferably maintained at 30°–100° C. (about 30°–about 100° C.). However, the reaction temperature may desirably be higher when only high boiling substances are being copolymerized than when the copolymerizable composition contains some relatively volatile substances. For example, when only dimethylstyrenes are being copolymerized, the temperature of the emulsion or dispersion is preferably from 70°–100° C. (about 70°–about 100° C.), while when products which are low boiling or gaseous at room temperature are being copolymerized with one or more dimethylstyrenes, the temperature is preferably maintained below 60° C. (about 60° C.). When dimethylstyrenes are copolymerized in bulk, the temperature is preferably 90°–130° C. (about 90°–about 130° C.).

If one or more of the substances being copolymerized with a dimethylstyrene is highly volatile at the temperature of the polymerization, the reaction may be carried out under pressure to avoid loss of the volatile material.

In order to increase the rate of copolymerization of the dimethylstyrenes with one another or with other substances, a small proportion, e. g., 0.01–5% of a polymerization catalyst such as the organic peroxides and hydrogen peroxides or ozonides may be used. Hydrogen peroxide may be incorporated in the aqueous phase of emulsions of the copolymerizable materials or in aqueous dispersions thereof, and other water-soluble polymerization catalysts which may be employed are the persulfates such as potassium persulfate, percarbonates, perborates, etc. Organic peroxides may be incorporated in the copolymerizable compositions, and examples of such substances are benzoyl acetic peroxide, acetic peroxide, benzoyl peroxide, lauric peroxide, oleic peroxide, stearic peroxide, tertiary butyl hydroperoxide, etc.

Polymerization promoters such as nitrogen compounds, i. e., melamine, monohydric and polyhydric phenols, i. e., pyrogallol, hydroquinone, phenol, may be used in conjunction with the polymerization catalyst if desired as described in my copending applications Serial Nos. 763,763–5, now U. S. Patents 2,552,327–9 respectively, filed July 25, 1947.

In order to obtain light colored products, particularly when a mixture consisting of styrenes and including one or more dimethylstyrenes is used, it is preferable that the reaction be carried out in the absence of a polymerization catalyst and in the absence of air. Under certain conditions ultraviolet light may be used, and ozone may also be utilized to promote copolymerization.

The dimethylstyrenes may be copolymerized with one another or with one or more polymerizable cyclic compounds containing an ethylenic double bond either in bulk or in the form of aqueous dispersions or emulsions. Suitable dispersing agents include talc, calcium phosphate, styrene-maleic acid heteropolymers, dimethylstyrene-maleic acid heteropolymers, methyl cellulose, polyvinyl alcohol, methyl starch, glycol cellulose, polyacrylamide, etc.

When the dimethylstyrenes are copolymerized in emulsions, either anionic or cationic emulsifiers may be used including, for example, sodium hydroxystearate, the sodium salts of long chain sulfated alcohols (such as sodium lauryl sulfate), the sodium salts of organic sulfonates including the sodium salts of alkyl substituted naphthalene sulfonic acids, the sodium salts of the alkyl esters of sulfosuccinic acid such as the sodium salt of the dioctyl ester of sulfosuccinic acid, dodecylamine hydrochloride, dodecylamine formate, quaternary ammonium compounds such as trimethyl benzyl ammonium chloride, etc. Mixtures of the various emulsifying agents may be employed, and it has been found that mixtures including a sodium salt of an alkyl ester of sulfosuccinic acid such as the one mentioned above with the sodium salt of an alkyl naphthalene sulfonic acid is especially suitable.

The copolymerization of dimethylstyrenes in aqueous dispersions results in a relatively slow polymerization to give a copolymer which precipitates during the reaction, whereas copolymerization of the dimethylstyrenes in emulsion form results in a more rapid copolymerization and a copolymer of somewhat higher molecular weight. Furthermore, the copolymer obtained by emulsion polymerization generally remains dispersed and may be used in the form of a dispersion or coagulated to obtain the solid polymers.

The polymerization may be carried out by continuous methods.

It has been stated that the dimethylstyrenes being copolymerized must be substantially pure. In order to maintain the necessary degree of purity after preparation of the monomer in accordance with the Sturrock and Lawe patent mentioned above or by any other suitable process, the dimethylstyrenes must be stabilized to prevent polymerization during storage. For this purpose small proportions of polymerization inhibitor such as hydroquinone are incorporated in the dimethylstyrenes. Prior to polymerization this polymerization inhibitor is preferably removed either chemically or physically. For example, I have found that the inhibitor may be effectively removed by means of an adsorbent such as, for example, silica gel. If the polymerization inhibitor be permitted to remain in the dimethylstyrene, sufficiently large proportions of polymerization catalyst should be used in order to cause the polymerization reaction to proceed. Alternatively, polymerization retarders which decompose upon heating may be used to stabilize the dimethylstyrenes during storage, and a dimethylstyrene containing these substances may be polymerized without a preliminary purification step.

My invention relates broadly to copolymers of dimethylstyrenes and cyclic compounds having an ethylenic double bond which are of relatively high molecular weight. They are normally solid, they are fusible, and soluble, and they have a minimum intrinsic viscosity of about 0.1. By "soluble" is meant solubility in styrene solvents such as benzene, toluene, xylene and other aromatic hydrocarbons as well as their chlorinated derivatives such as chlorobenzene, etc., halogenated aliphatic hydrocarbons such as ethylene dichloride, etc., ketones such as methyl ethyl ketone, etc., esters such as butyl acetate, etc., and the like. Certain of the copolymers are also soluble in ethyl ether.

The copolymers of my invention possess many advantages. Copolymers of styrene with dimethylstyrenes, and particularly with 2,4-dimethylstyrene, possess the desirable characteristics of polystyrene with increased resistance to heat. Such copolymers are practically completely resistant to boiling water, they possess crystal clarity, adequate strength, moldability, and resistance to crazing—a unique combination of properties in the injection molding field. A 50–50 mixture of styrene and 2,4-dimethylstyrene has a moldability equal to commercial polystyrene in deep draws and intricate moldings with inserts at cylinder temperatures increased approximately 50° F. and mold temperatures of 150° —175° F. Molded spoons, tumblers, thermometer cases, and hypodermic syringes show excellent resistance to one hour boiling. Molded tumblers have an impact strength double that of polystyrene as measured by service tests. The desirable properties of these styrene-dimethylstyrene copolymers are particularly important since styrene is readily available at the present time in large quantities at a low cost.

The aqueous emulsions of polymers or solutions of polymers of the dimethylstyrenes dissolved in organic liquids may be used in the treatment of fibrous materials including paper, textiles, leather, etc. The polymer may be applied in the form of a coating and subsequently calendered to give a smooth water resistant finish or the materials may be impregnated, for example, in order to increase their resistance to the passage of vapors and moisture therethrough.

Copolymers consisting of styrene and/or dimethylstyrenes produced in accordance with my invention may be formed into sheets or fibers by extrusion and, if desired, drawn to form products having high tensile strength.

While my copolymeric materials are especially suitable for use in the production of molded articles which are clear and substantially transparent, they may have dyes, pigments, or filler incorporated therein if desired. It is an advantage of my invention that its copolymers may be milled for color incorporation and still retain properties equal to those of polystyrene.

My copolymers may be employed in coating compositions, including paints, lacquers, enamels, and varnishes, etc. In such cases various other resins, both natural and synthetic, and plasticizers may be incorporated in the compositions.

Obviously, many modifications and variations in the processes and compositions described above may be made without departing from the scope and spirit of the invention as defined in the appended claims.

This is a continuation-in-part of my copending application Serial No. 563,450 filed November 14, 1944, now abandoned.

I claim:

1. A soluble, thermoplastic, solid copolymer of (1) a material selected from the group consisting of 2,4-dimethyl styrene, 2,5-dimethyl styrene, and 3,4-dimethyl styrene and (2) a different material selected from the group consisting of styrene, 2,4-dimethyl styrene, 2,5-dimethyl styrene, 3,4-dimethyl styrene, $\alpha$,p-dimethyl styrene, $\alpha$-methyl styrene, and 2,5-dichlorostyrene, each of said materials being present in an amount equivalent to at least 10% of the total weight of said copolymer, the dimethyl styrenes of (1) having a melting point range of no more than 3° C. and an optical exaltation of at least 1, and said copolymer having an intrinsic viscosity of at least 0.1.

2. A soluble, thermoplastic, solid copolymer according to claim 1, in which the material of (2) is styrene.

3. A process of preparing a soluble, thermoplastic, solid copolymer which comprises maintaining at a temperature of from 20° C. to 200° C. a mixture of materials including (1) a material selected from the group consisting of 2,4-dimethyl styrene, 2,5-dimethyl styrene, and 3,4-dimethyl styrene and (2) a different material selected from the group consisting of styrene, 2,4-dimethyl styrene, 2,5-dimethyl styrene, 3,4-dimethyl styrene, $\alpha$,p-dimethyl styrene, $\alpha$-methyl styrene, and 2,5-dichlorostyrene, each of said materials being present in an amount corresponding to at least 10% of the total weight of the mixture, until a copolymer having an intrinsic viscosity of at least 0.1 is obtained, said dimethylstyrenes of (1) having a melting point range of no more than 3° C. and an optical exaltation of at least 1.

4. A process according to claim 3 in which the material of (2) is styrene.

5. A process according to claim 3 in which said mixture is in the form of a dispersion.

6. A process according to claim 3 in which said mixture is in the form of an emulsion.

7. A soluble, thermoplastic, solid copolymer of at least two dimethylstyrenes selected from the group consisting of 2,4-dimethylstyrene, 2,5-dimethylstyrene, and 3,4-dimethylstyrene, each copolymerizable material being present in an amount equivalent to at least 10% of the total weight of all of said copolymerizable materials, each of said dimethylstyrenes having a melting point range of no more than 3° C. and an optical exaltation of at least 1, and said copolymer having an intrinsic viscosity of at least 0.1.

8. A process which comprises maintaining at a temperature of from 20° C. to 200° C. a mixture of at least two dimethylstyrenes selected from the group consisting of 2,4-dimethylstyrene, 2,5-dimethylstyrene and 3,4-dimethylstyrene, each copolymerizable material being present in an amount equivalent to at least 10% of the total weight of all of said copolymerizable materials, until a copolymer having an intrinsic viscosity of at least 0.1 is obtained, each of said dimethylstyrenes having a melting point range of no more than 3° C. and an optical exaltation of at least 1.

9. A soluble, thermoplastic, solid copolymer of a mixture containing, as the sole polymerizable ingredients, 50% by weight of 2,4-dimethylstyrene and 50% by weight of styrene, said 2,4-dimethylstyrene having a melting point range of no more than 3° C. and an optical exaltation of at least 1, and said copolymer having an intrinsic viscosity of at least 0.1.

EDWARD L. KROPA.

REFERENCES CITED

The following references are of record in the file of this patent:

UNITED STATES PATENTS

| Number | Name | Date |
|---|---|---|
| 1,683,401 | Ostromislensky | Sept. 4, 1928 |
| 1,683,402 | Ostromislensky | Sept. 4, 1928 |
| 2,255,729 | Britton et al. | Sept. 9, 1941 |
| 2,269,810 | Driesbach et al. | Jan. 13, 1942 |
| 2,366,007 | D'Alelio | Dec. 26, 1944 |
| 2,471,785 | Seymour | May 31, 1949 |